US008210751B2

(12) United States Patent
Streit et al.

(10) Patent No.: US 8,210,751 B2
(45) Date of Patent: Jul. 3, 2012

(54) ROLLER BEARING

(75) Inventors: Edgar Streit, Poppenlauer (DE); Oskar Beer, Landshut (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 769 days.

(21) Appl. No.: 12/302,345

(22) PCT Filed: May 23, 2007

(86) PCT No.: PCT/DE2007/000933
§ 371 (c)(1),
(2), (4) Date: Jan. 22, 2009

(87) PCT Pub. No.: WO2007/137558
PCT Pub. Date: Dec. 6, 2007

(65) Prior Publication Data
US 2009/0263067 A1 Oct. 22, 2009

(30) Foreign Application Priority Data
May 26, 2006 (DE) .......................... 10 2006 024 603

(51) Int. Cl.
*F16C 33/62* (2006.01)
(52) U.S. Cl. .................................... 384/492; 384/907.1

(58) Field of Classification Search .................. 384/492, 384/527, 576, 907.1, 910, 911, 913; 415/229
See application file for complete search history.

(56) References Cited

U.S. PATENT DOCUMENTS

| 3,212,834 | A | * | 10/1965 | Mayer et al. | 384/492 X |
| 3,711,171 | A | * | 1/1973 | Orkin et al. | 384/907.1 |
| 5,593,234 | A | | 1/1997 | Liston | |
| 6,808,310 | B2 | * | 10/2004 | Ooitsu et al. | 384/527 |
| 2004/0116242 | A1 | | 6/2004 | Uchiyama et al. | |

FOREIGN PATENT DOCUMENTS
EP   1 225 353 A   7/2002
* cited by examiner

*Primary Examiner* — Gregory Binda
(74) *Attorney, Agent, or Firm* — Lucas & Mercanti, LLP; Klaus P. Stoffel

(57) ABSTRACT

A roller bearing which has a roller bearing ring. In order to produce a roller bearing that has a high rotational speed value and operational load using minimum quantity lubrication and in which heat produced in the bearing can be removed in a rapid and reliable manner, the roller bearing ring is made of a material composite. The first material composite component forms the running surface and is made of a refractory metal or a sintering material. The thermal conductivity and heat resistance first material composite component is higher than the thermal conductivity and heat resistance of at least one additional material composite component which forms the base body of the roller bearing ring.

6 Claims, 1 Drawing Sheet

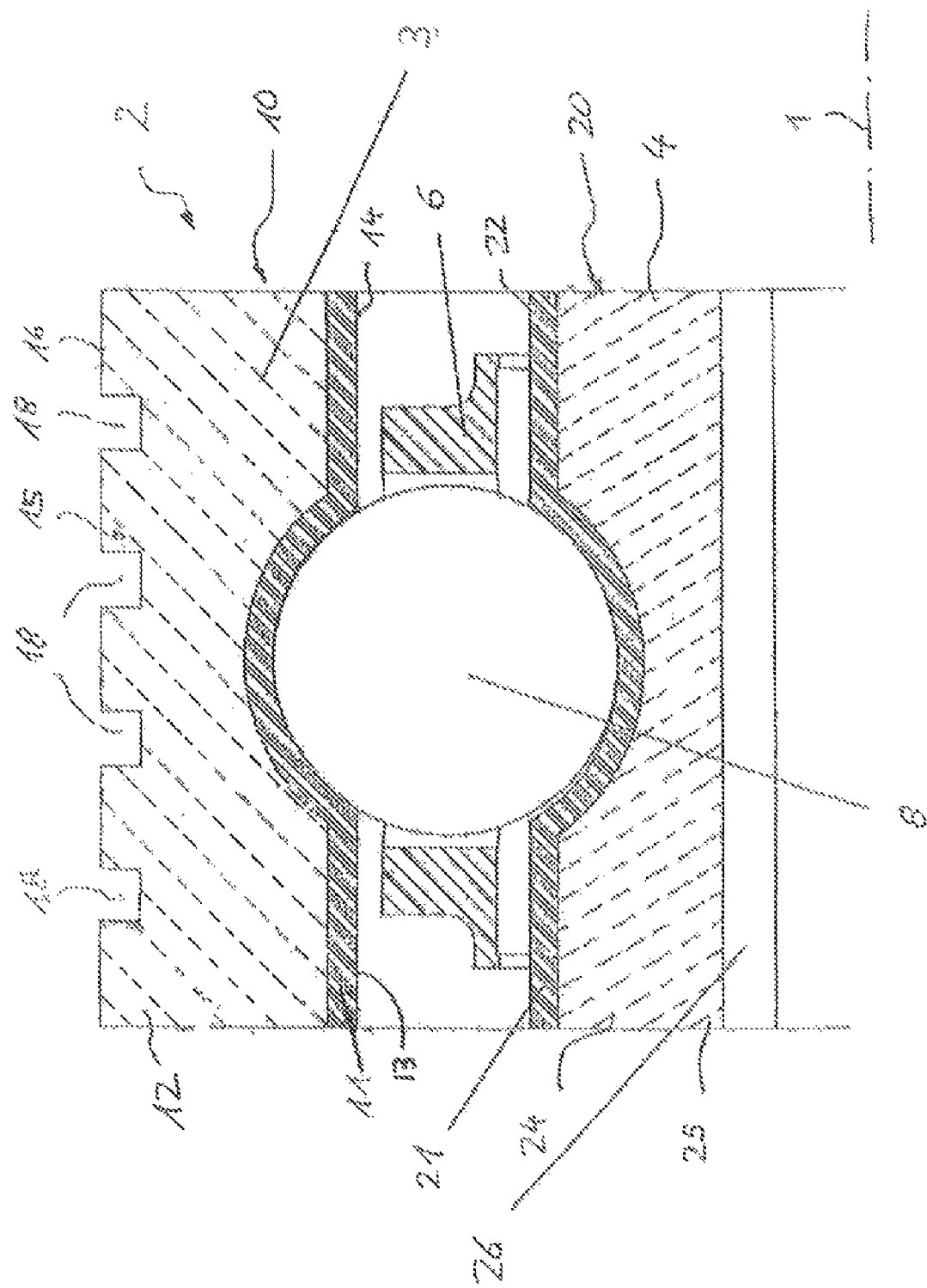

ROLLER BEARING

This application is a 371 of PCT/DE2007/000933 filed May 23, 2007, which in turn claims the priority of DE 10 2006 024 603.9 filed May 26, 2006, the priority of both applications is hereby claimed and both applications are incorporated by reference herein.

BACKGROUND OF THE INVENTION

The invention relates high-power roller bearings. In particular, the invention relates to roller bearings for use in main shaft bearing systems in high-speed gas turbines, transmissions and, for example, for rotor bearings in helicopters.

In such applications, operating temperatures far above 200° C. can easily occur in the contact region between the roller bodies and the bearing rings owing to the very high operating speeds with extremely high loads. The heat which is produced at high rotational speeds due to friction has to be conducted away reliably and promptly in order to avoid damage to the bearings. For this reason, in the past relatively high flow rates of oil were necessary to cool the bearings, and only a very small proportion of said flow rates were required to lubricate the bearings. The overwhelming portion of the quantity of oil serves to conduct away heat.

In many applications, for example in aeronautics, extremely high demands are placed on operational safety and reliability. For this reason, the assemblies which are required for the throughflow of oil, for example pumps, cooling assemblies and safety systems, generally have to be of redundant design and configured to be highly reliable. This affects both manufacturing and maintenance costs and the weight of the systems equipped in this way.

SUMMARY OF THE INVENTION

Against this background, the object of the present invention is to provide a roller bearing which tolerates high rotational speed values and large operational loads even with minimal lubrication. Minimal lubrication is understood to mean both what is referred to as emergency lubrication, (i.e. a supply of lubricant which is considerably reduced in critical lubrication situations or the presence of only a mist of lubricant) as well as the intentional reduction in the quantity of lubricant. This results in a particular problem to be solved by the present invention, which is to conduct away quickly and reliably the heat generated in the bearing and at the same time minimize the production of heat. In this context, the roller bearing components have to be configured in such a way that even at operating temperatures above 300° C. they still have sufficient hardness in the contact region between the bearing rings and roller bearing bodies.

This object is achieved according to the invention by means of a roller bearing having a roller bearing ring which is composed of a material composite, wherein the first material composite component forms the running track and is preferably composed of a refractory metal or a sintered material whose thermal conductivity and heat resistance are higher than the thermal conductivity and heat resistance of the at least one further material composite component which forms the base body of the roller bearing ring.

A significant advantage of the invention is that (functionally) different regions of the bearing ring can be optimized separately in terms of requirements, which vary on a function-specific basis, with respect to hardness and heat resistance on the one hand and toughness on the other. In the region in which the actual roller body contact takes place (also generally referred to as running track here) a very high degree of hardness and of heat resistance are desired, while for the remaining bearing body or the so-called bearing back a particularly high level of toughness is desirable. The material composite component which forms the running track preferably has a permitted continuous operating temperature of higher than 300° C., a thermal conductivity value of more than 30 W/mK and a high resistance to wear in order to ensure optimum roll-over properties.

Within the scope of the invention, a roller bearing is provided on the outer and/or inner ring of which cooling mechanisms can be provided for transporting away the heat which is produced. It is considered particularly advantageous here that increased removal of heat via the correspondingly optimized material composite component is ensured in the region of the running track and at the same time increased absorption of heat in the material is possible. This particularly preferably permits the arrangement of a cooling system on the outer ring.

What are referred to as refractory metals, specifically the metals molybdenum, tungsten, niobium and tantalum are particularly suitable as the material composite component for the running track. The two last-mentioned refractory metals are optimally suitable in terms of their properties for use in the present invention but are relatively expensive. One preferred refinement of the invention therefore provides for the first material composite component to be predominantly composed of molybdenum or tungsten or to have at least a considerable proportion (for example far above 70%) of molybdenum or tungsten.

According to one advantageous refinement of the invention, hard metals in the form of sintered materials, particularly preferably carbides which are sintered with cobalt and/or nickel as binding agents, are used as the first material composite component.

The part of the roller bearing according to the invention which faces away from the running track region (said part also being generally referred to as the bearing ring back or base body) can, according to the invention, advantageously be optimized independently in terms of its material properties. Fewer stringent demands in terms of hardness and resistance to wear are made of the base body, but a considerably higher level of toughness is desired. This applies in particular to the inner bearing ring of a roller bearing which, in addition to a high level of heat resistance, must have a particularly high level of toughness. The inner bearing ring is usually shrink-fitted onto the rotating shaft and is therefore under considerable tensile prestress. The considerable centrifugal forces acting at the high rotational speeds further increase the loading on the inner bearing ring.

According to one advantageous refinement of the invention, the base body is also formed from a refractory material which is optimized through suitable alloying or powder-metallurgical manufacture in the direction of the demands described above. A material based on molybdenum is particularly preferred.

Against the background of the considerable operational loads described at the beginning, it is sometimes insufficient for instances of particularly high loading only to optimize the bearing rings in terms of their operating behavior and endurance strength. In these cases there is in fact also the risk of fatigue which comes from the roller bodies and could adversely affect the overall reliability of the bearings. For this reason, according to one advantageous refinement of the invention there is provision for the roller bodies to be formed from ceramic materials. In this context, ceramic materials based on silicon nitride can particularly preferably be used.

Finally it is recommended for such applications also to configure the roller body cage to be correspondingly heat resistant. According to one development or the invention which is advantageous in this regard, there is provision for a roller body cage made of siliconized CFC to be used. This is to be understood as a carbon-fiber-reinforced material in which the matrix is also composed of carbon atoms into which carbon fibers are introduced in a manner known per se to provide reinforcement.

BRIEF DESCRIPTION OF THE DRAWING

An exemplary embodiment of the invention is described below on the basis of the single FIGURE in the drawing.

DETAILED DESCRIPTION OF THE INVENTION

The FIGURE shows a longitudinal section through just the top region of a roller bearing 2 which is symmetrical about the operational rotational axis 1. The roller bearing has an outer bearing ring 3 and an inner bearing ring 4. Roller bearings 8, in the form of bearing balls here, which are arranged in a cage 6 are located in a manner known per se between the bearing rings 3, 4.

The outer bearing ring 3 is formed from a material composite 10 which comprises a first material composite component 11 and a second material composite component 12. The first material composite component 11 forms the running track 13 on whose surface 14, the actual running surface, the roller bodies 8 (bearing balls) roll operationally. This material composite component 11 has a very high level of heat resistance of more than 300° C. continuous temperature and a high thermal conductivity significantly above 30 W/mK with respect to the high loads and operating temperatures to which the roller bearing according to the invention is subjected operationally.

The first material composite component is composed, for example, of a material based on a refractory metal, preferably molybdenum or tungsten, which is distinguished, as is known, by the property of a very high melting temperature which is inherent in refractory metals, or is composed of a sintered material which is rich in carbides. Alternatively, the first material composite component is composed, for example, of a sintered material such as cobalt-sintered and/or nickel-sintered carbides.

The second material composite component 12 forms, outside the running track, the other part of the bearing ring 10 which is also denoted as the base body 15, and in the exemplary embodiment is also composed of a refractory metal based on molybdenum which is, however, compacted and in this respect has a higher level of toughness but nevertheless a high level of thermal conductivity.

A plurality of cutouts 18 for a coolant from a coolant system (not illustrated in more detail) to flow through are provided on the outer casing surface 16 of the base body 15. This effectively conducts away the friction power generated owing to the friction at the extremely high rotational speeds between the roller bearing ring 10 and the roller bodies 8.

The inner bearing ring 4 is also formed from a material composite 20 in which, as already described, a first material composite component 21 which forms the inner running track 22 for the roller bodies 8 is provided. The material composite 20 has a base body 24 composed of a further material composite component 25 which is optimized as described above in relation to the outer bearing ring 3. In addition, cutouts 26 for the coolant to pass through and for the purpose of cooling the inner bearing ring 4 are also provided in the inner bearing ring. The base bodies 12 and 24 of the outer bearing ring 3 and respectively of the inner bearing ring 4 can also be formed from a refractory material based on molybdenum.

The roller bearings 8 are preferably formed from ceramic materials and are secured in a roller body cage 6 which is manufactured from siliconized carbon-fiber-reinforced carbon (CFC).

The roller bearing can therefore be respectively optimized on an individual basis in terms of its strength behavior and temperature behavior so as to meet the operational demands placed on the different functional regions of the bearing rings 3, 4 in that, specifically, the running tracks and therefore the mechanically highly loaded regions are formed by a highly heat resistant, very hard and wear-resistant material. Said material is respectively implemented by means of the first material composite component, while the thermal and mechanical properties which are desired in the other regions of the bearing rings are optimized through the use of a second material composite component with a significantly higher level of toughness.

LIST OF REFERENCE NUMERALS

1 Rotational axis
2 Roller bearing
3 Outer bearing ring
4 Inner bearing ring
6 Roller body cage
8 Roller body
10 Material composite
11 First material composite component
12 Second material composite component
13 Running track
14 Surface
15 Base body
16 Outer casing surface
18 Cutouts
20 Material composite
21 First material composite component
22 Inner running track
24 Base body
25 Further material composite component
26 Cutouts

The invention claimed is:

1. A roller bearing, comprising:
a roller bearing ring, which is composed of a material composite that includes a first material composite component, which forms a running track and at least one further material composite component, which forms a base body of the roller bearing ring,
the first material composite component is composed of a first refractory metal or a sintered material that has a thermal conductivity and a heat resistance which are higher than a thermal conductivity and a heat resistance of the at least one further material composite component which is formed from a second refractory metal.

2. The roller bearing as claimed in claim 1, wherein the first material composite component contains molybdenum or tungsten as a main component.

3. The roller bearing as claimed in claim 1, wherein the first material composite component is composed of cobalt-sintered and/or nickel-sintered carbides.

4. The roller bearing as claimed in claim 1, wherein the second refractory metal of the base body is based on molybdenum.

5. The roller bearing as claimed in claim 1, wherein the roller bearing has roller bodies and the roller bodies are formed from ceramic materials.

6. The roller bearing as claimed in claim 1, wherein the roller bearing has a roller body cage and the roller body cage is made of siliconized CFC.

* * * * *